(12) United States Patent
Zalesak et al.

(10) Patent No.: US 6,526,781 B1
(45) Date of Patent: Mar. 4, 2003

(54) METHOD FOR ROLL FORMING GLASS SHEETS

(75) Inventors: Thomas J. Zalesak, Rossford, OH (US); Eustace Harold Mumford, Ottawa Lake, MI (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

(21) Appl. No.: 09/482,780

(22) Filed: Jan. 13, 2000

Related U.S. Application Data

(62) Division of application No. 09/176,378, filed on Oct. 21, 1998, now Pat. No. 6,035,666.

(51) Int. Cl.⁷ .......................................... C03B 23/023
(52) U.S. Cl. .................... 65/106; 65/102; 65/245; 65/254; 65/273; 65/287; 65/289; 65/290; 65/291
(58) Field of Search ..................... 65/102, 106, 245, 65/254, 273, 287, 289, 290, 291

(56) References Cited

U.S. PATENT DOCUMENTS

| | | | |
|---|---|---|---|
| 3,226,219 A | | 12/1965 | Jamnik |
| 3,701,644 A | | 10/1972 | Frank |
| 3,869,269 A | * | 3/1975 | Knapp .......................... 65/106 |
| 4,218,232 A | * | 8/1980 | Wilhelm ........................ 65/106 |
| 4,586,946 A | | 5/1986 | Kramer et al. |
| 4,784,681 A | | 11/1988 | McMaster |
| 4,976,763 A | | 12/1990 | Agius |
| 5,049,178 A | | 9/1991 | Pereman et al. |
| 5,201,928 A | | 4/1993 | Dicks et al. |
| 5,246,477 A | * | 9/1993 | Kramer .......................... 65/273 |
| 5,302,176 A | | 4/1994 | Shibuya et al. |
| 5,368,625 A | | 11/1994 | Mizusugi |
| 5,545,245 A | | 8/1996 | Mizusugi |

* cited by examiner

Primary Examiner—Michael Colaianni
(74) Attorney, Agent, or Firm—Brooks & Cushman P.C.

(57) ABSTRACT

A method for roll forming a heated glass sheet utilizes a forming conveyor (62) including forming rolls (66) that are pivotally moved upwardly between horizontal rolls (46) of a horizontal conveyor (44) on opposite sides of a centerline (C/L) of the horizontal conveyor to rollingly engage the heated glass sheet above a plane of conveyance of the horizontal conveyor at its centerline to roll form the glass sheet in cooperation with a forming press (80) having rotatable forming members (82) that rollingly engage the heated glass sheet from above. A second set of forming rolls (68) cooperates with the first set of forming rolls (66) to provide the roll forming. First and second sets of roll cradles (76,90) are mounted by pivotal supports (128,142) on associated first and second carriages (154,156) and moved by first and second actuators (78,92). Lateral movement of the carriages (154,156) provides versatility in the glass sheet shapes that can be formed.

5 Claims, 8 Drawing Sheets

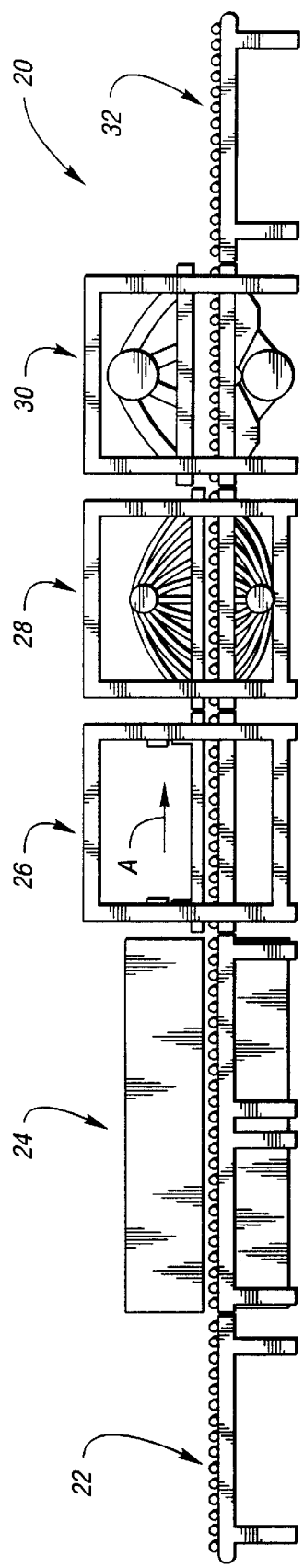
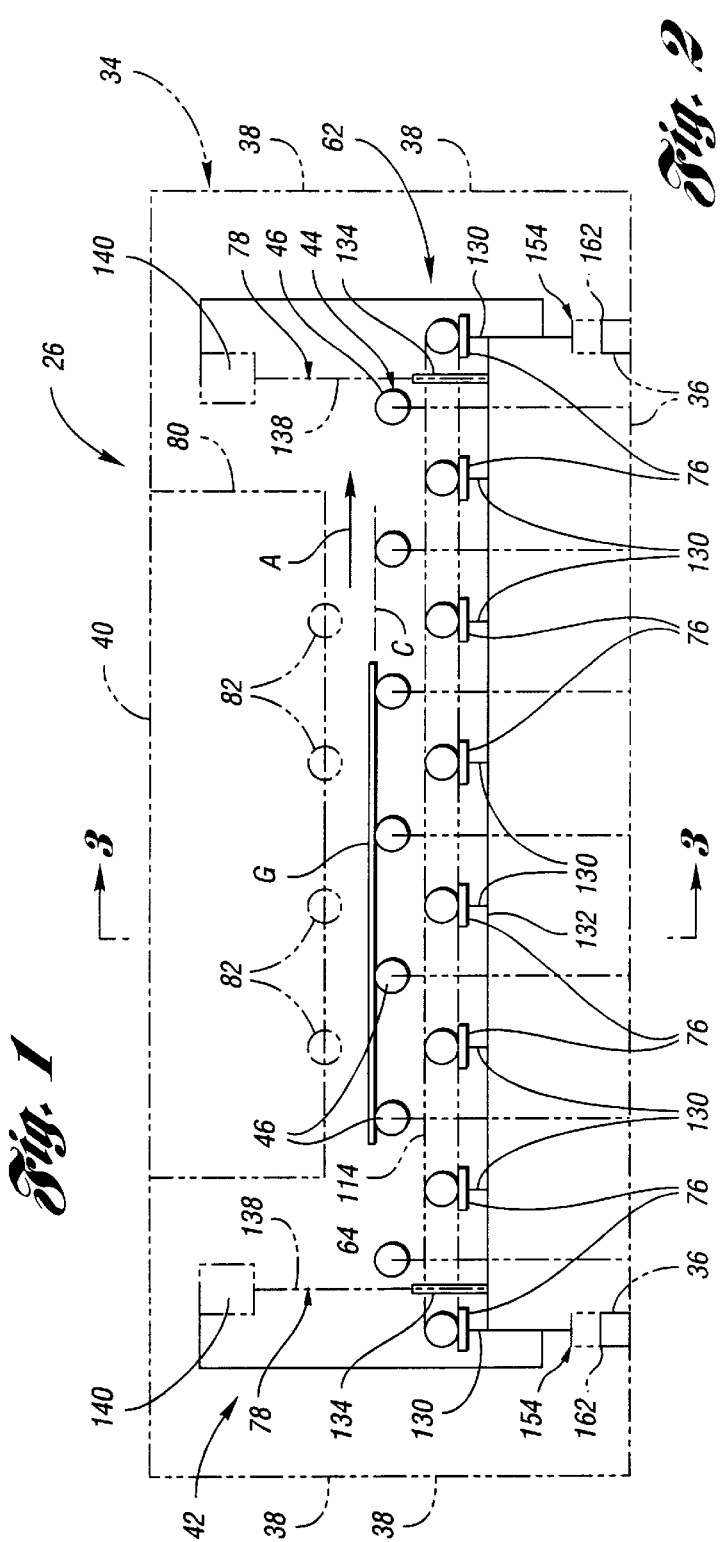

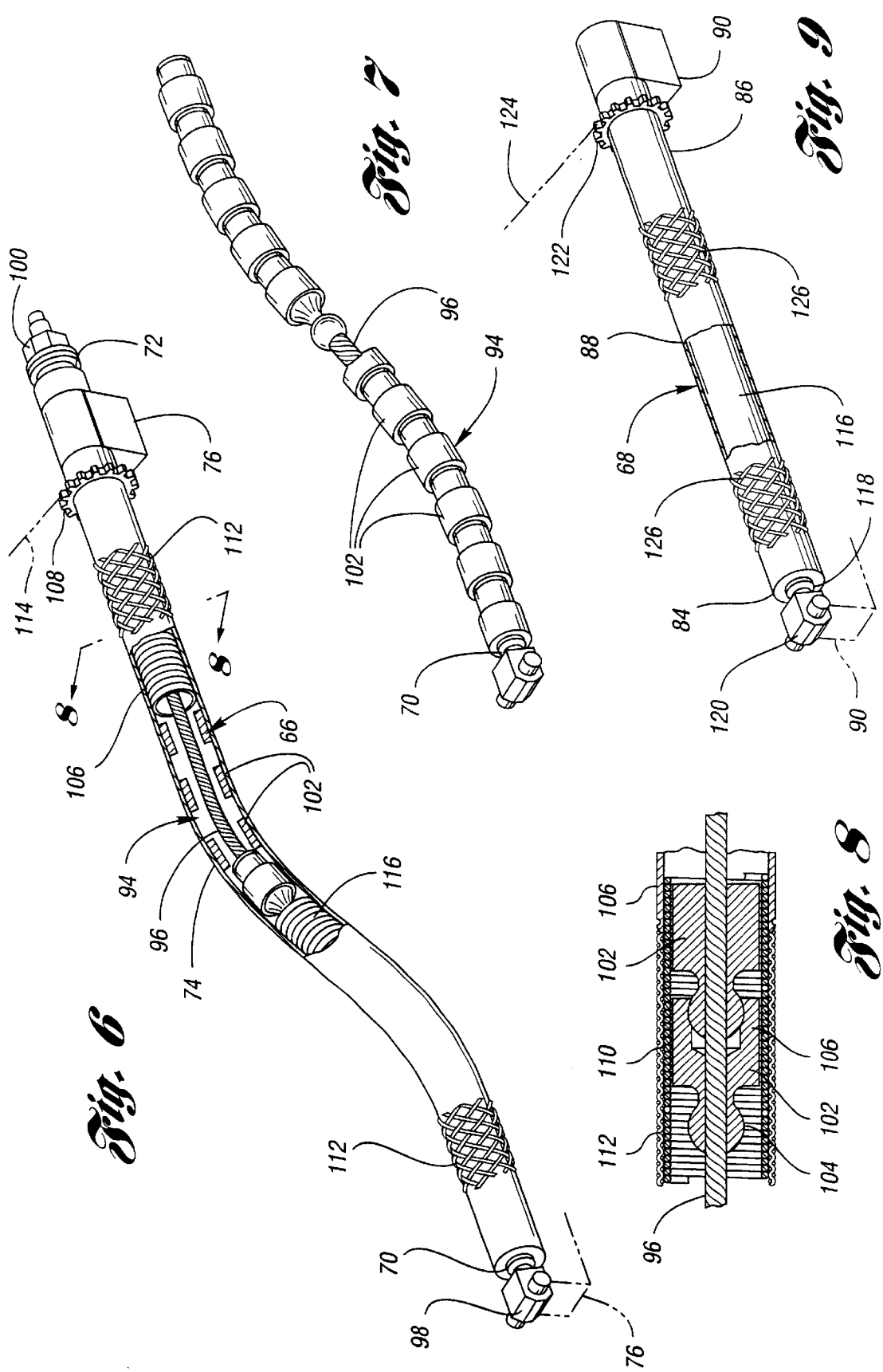

METHOD FOR ROLL FORMING GLASS SHEETS

This is a divisional of application Ser. No. 09/176,378 filed on Oct. 21, 1998, now U.S. Pat. No. 6,035,666.

TECHNICAL FIELD

This invention relates to apparatus and a method for roll forming a heated glass sheet.

BACKGROUND ART

As disclosed by U.S. Pat. No. 5,201,928 Dicks et al., heated glass sheets have previously been roll formed by conveyance on a horizontal roll conveyor between whose conveyor rolls forming rolls are moved upwardly to rollingly engage the glass sheet and provide its forming. More specifically, that roll forming of the heated glass sheet is disclosed as utilizing rotatable forming members that rollingly engage the glass sheet from above upon the roll forming to cooperate with the forming rolls. Furthermore, first and second sets of the forming rolls are disclosed located on opposite sides of a centerline of the horizontal conveyor such that there is no upward movement of any roll portion at the centerline and, as such, some glass shapes cannot be roll formed on this type of apparatus.

DISCLOSURE OF INVENTION

An object of the present invention is to provide an improved method for roll forming a heated glass sheet.

In carrying out the above object, the method for roll forming a heated glass sheet is performed by conveying the heated glass sheet onto a horizontal conveyor at a plane of conveyance thereof on horizontal rolls thereof spaced along a direction of conveyance and extending between opposite lateral sides of the horizontal conveyor with a centerline located centrally therebetween. A set of forming rolls are pivotally moved upwardly on roll cradles that are pivotally supported on one side of the centerline of the horizontal conveyor and that are actuated for vertical movement at the other side of the centerline of the horizontal conveyor to move the set of forming rolls upwardly between the horizontal rolls on opposite sides of and at the centerline of the horizontal conveyor such that the forming rolls rollingly engage and thereby roll form the heated glass sheet above the plane of conveyance of the horizontal conveyor at its centerline. The heated glass sheet is also rollingly engaged from above to cooperate with the forming rolls in roll forming the heated glass sheet.

The roll forming is also disclosed as utilizing a second set of forming rolls that are moved upwardly between the horizontal rolls of the horizontal conveyor to cooperate with the first set of forming roll and with rolling members that provide the rolling engagement of the heated glass sheet from above. The second set of forming rolls are moved on a second set of roll cradles that are pivotally supported and actuated for vertical movement on the same side of the centerline of the horizontal conveyor.

In addition to the roll forming of the heated glass sheet, the formed glass sheet is also disclosed as being quenched to provide heat strengthening or tempering.

BRIEF DESCRIPTION OF DRAWINGS

FIG. 1 is a side elevational view of a glass sheet processing system that embodies the invention and performs the method thereof to roll form a heated glass sheet.

FIG. 2 is an enlarged schematic side view of a forming station of the system for roll forming the heated glass sheet.

FIG. 6 is a broken away perspective view illustrating one type of forming roll that can be utilized with the forming station to provide curved glass shapes.

FIG. 7 is a view that illustrates a backbone of the forming roll shown in FIG. 6.

FIG. 8 is a sectional view taken along the direction of line 8—8 in FIG. 6 to further illustrate the construction of the roll backbone.

FIG. 9 is a view of another type of forming roll that is utilized with the forming station to provide flat glass shapes.

BEST MODE FOR CARRYING OUT THE INVENTION

Figure 3:
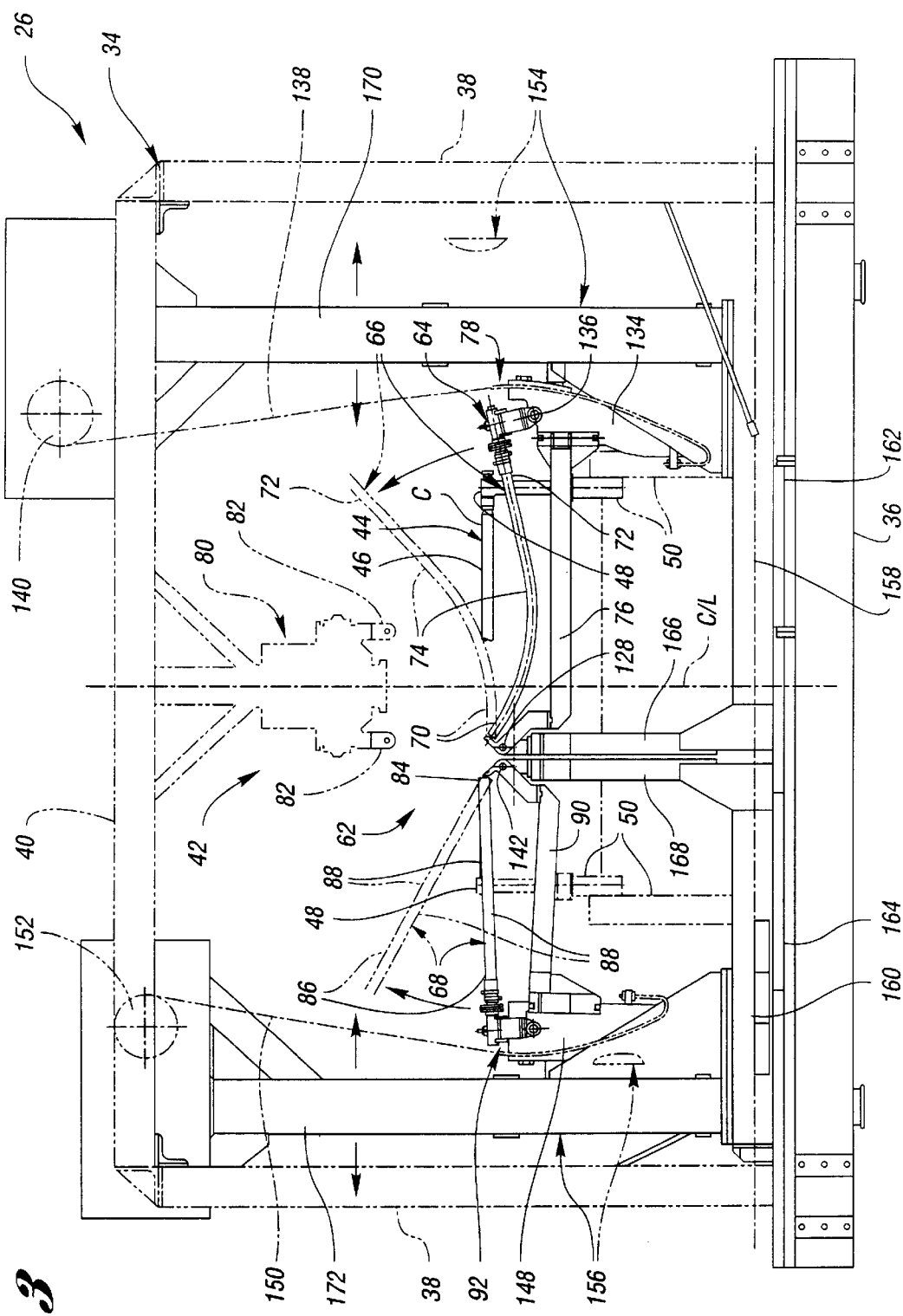
FIG. 3 is a cross-sectional view of the forming station taken along the direction of line 3—3 in FIG. 2 to illustrate the manner in which forming rolls are moved with respect to a horizontal conveyor to provide roll forming of the heated glass sheet.

With reference to FIG. 1 of the drawings, a glass sheet processing system generally indicated by 20 embodies the present invention to provide roll forming thereof as is hereinafter more fully described. This glass sheet processing system 20 includes a load station 22 onto which a glass sheet is loaded for the processing, a furnace 24 in which the glass sheet is heated in any conventional manner, a forming station 26 that is constructed in accordance with the present invention to provide roll forming of the heated glass sheet, a quench station 28 that quenches the formed glass sheet to provide heat strengthening or tempering, an after-cooling station 30 that further cools the formed glass sheet to a handling temperature, and an unload station 32 where the cooled, roll formed glass sheet is unloaded. As illustrated, each of the stations has a roll conveyor for conveying the glass sheet; however at certain of the stations other types of conveyors can be used such as gas hearth conveyors, except at the forming station 26 where roll conveyance must be utilized to practice the invention. Furthermore, the construction and method of operation of the forming station 26 will be described in an integrated manner to facilitate an understanding of the different aspects of the invention.

With reference to FIGS. 2 and 3, the forming station 26 includes a framework 34 having floor mounted lower beams 36, vertical posts 38, and horizontal upper beams 40 that cooperatively support roll forming apparatus 42 as is hereinafter more fully described.

Figure 4:
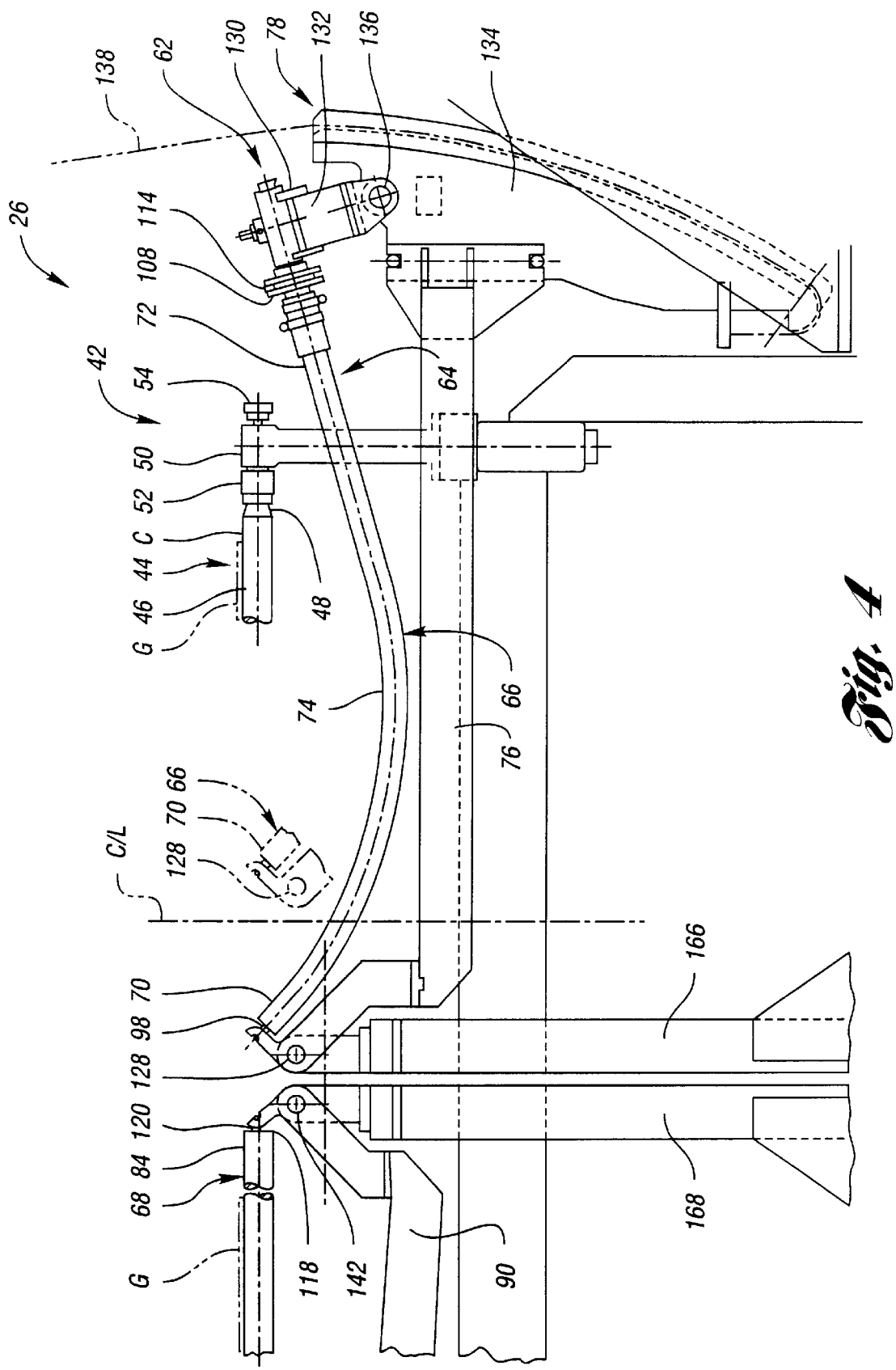
FIG. 4 is an enlarged view of a portion of FIG. 3 illustrating a right forming roll of the forming station.
Figure 5:
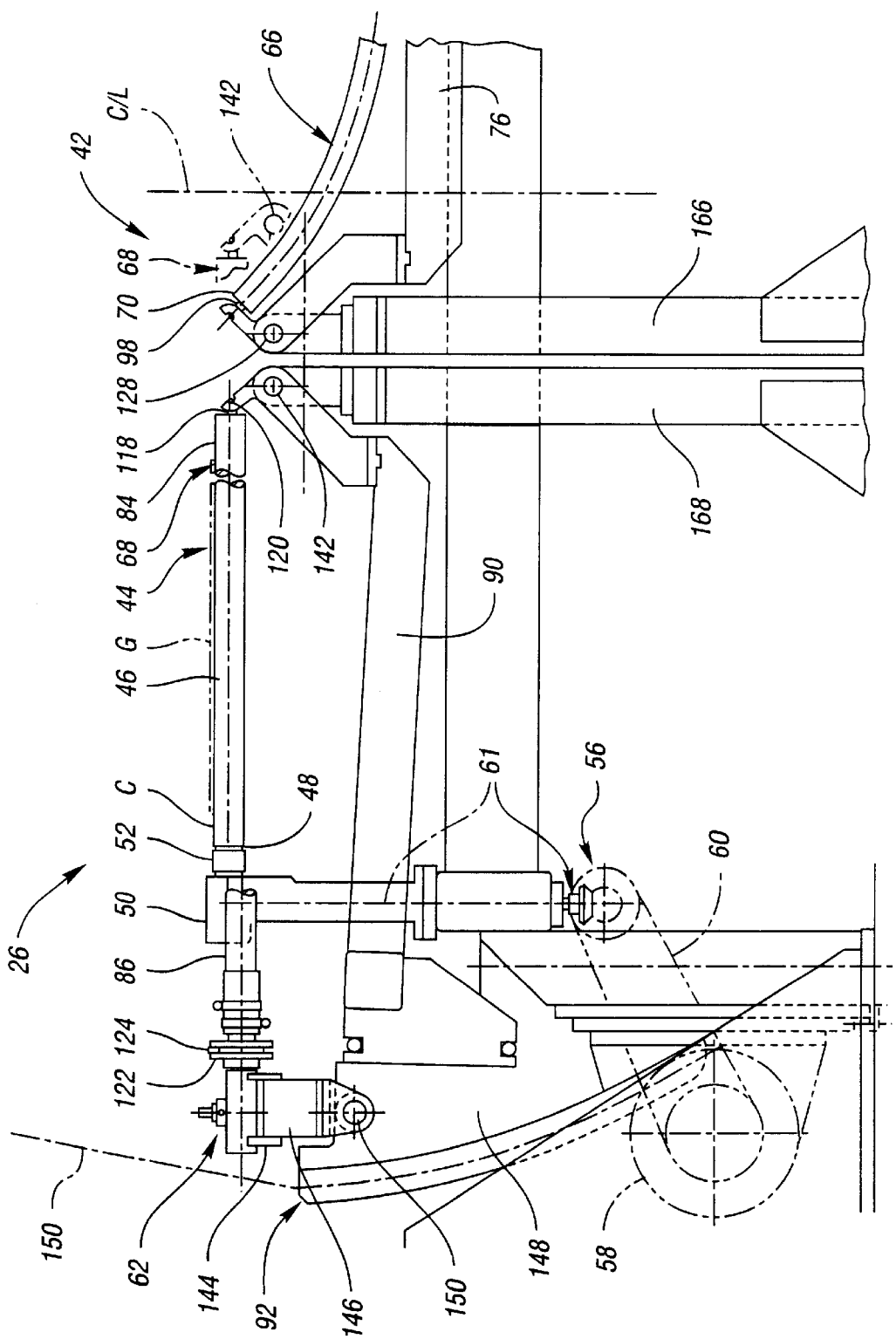
FIG. 5 is an enlarged portion of FIG. 3 illustrating a left forming roll of the forming station.
Figure 10A:
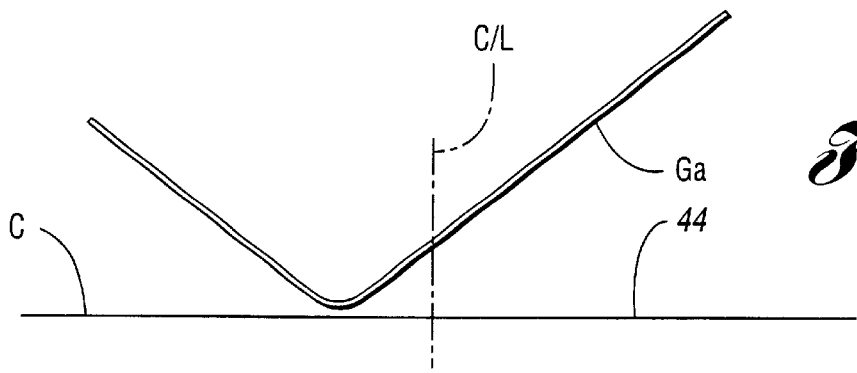
FIGS. 10a through FIGS. 10g are schematic cross-sectional views taken through the forming station to illustrate operation thereof in one mode where forming rolls are moved upwardly at a lateral centerline of the horizontal conveyor to provide the glass sheet forming to the different shapes illustrated.
Figure 10B:
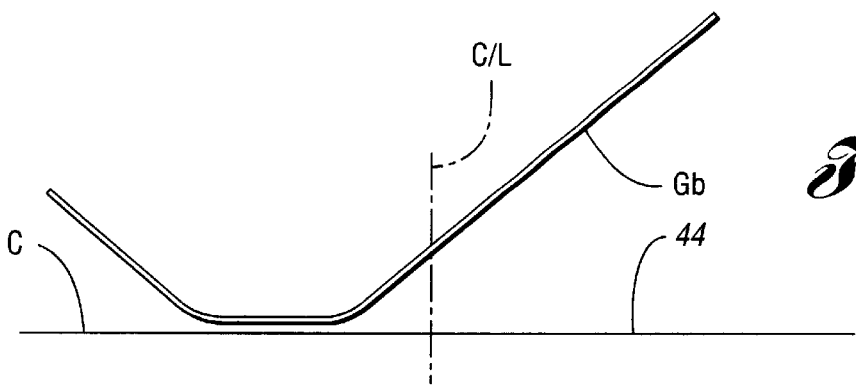
Figure 10C:
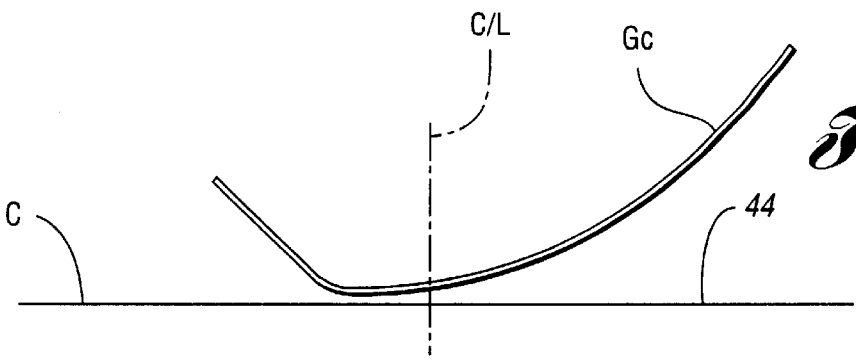
Figure 10D:
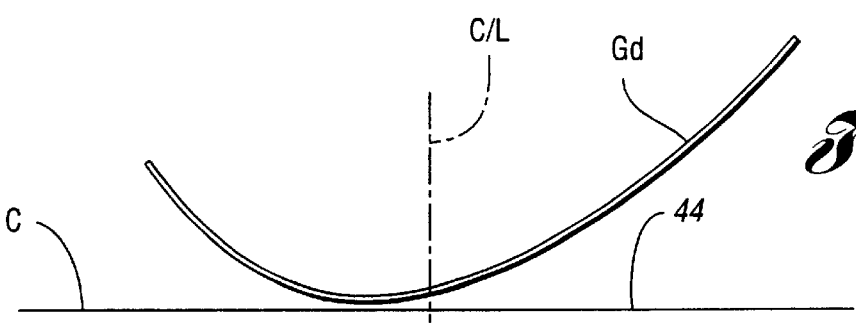
Figure 10E:
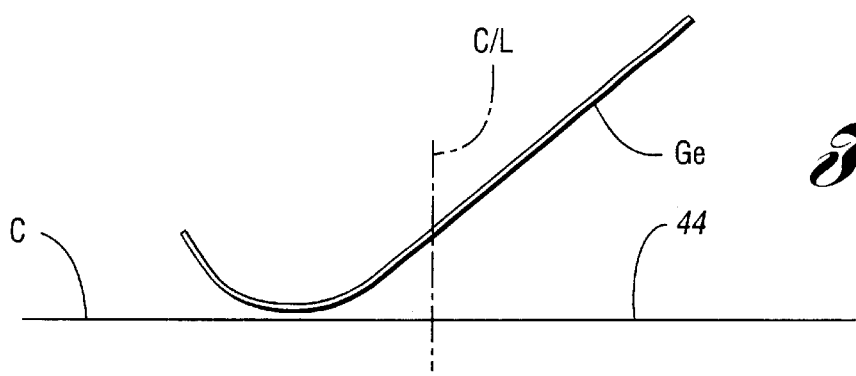
Figure 10F:
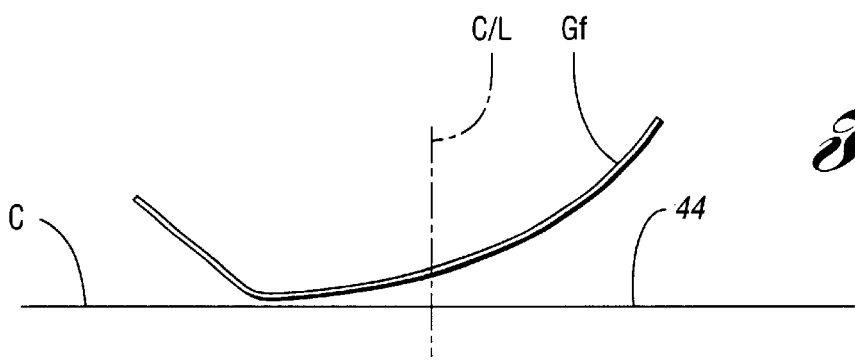
Figure 10G:
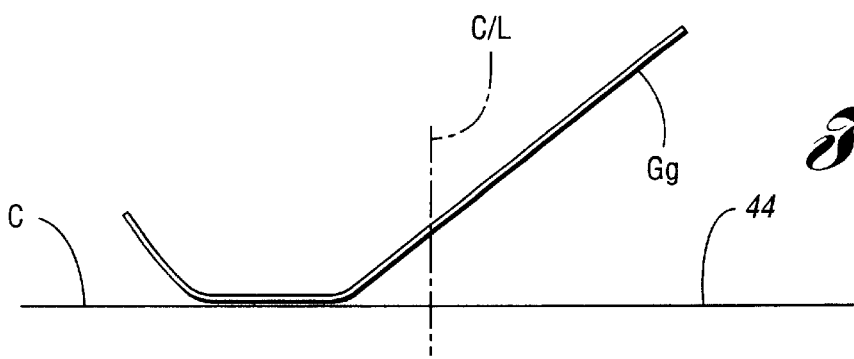
Figure 11A:
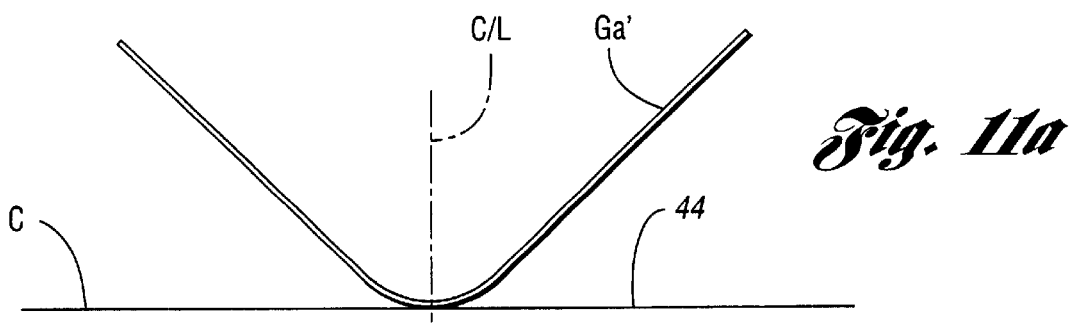
FIGS. 11a through FIGS. 11f are schematic views taken through the forming station to illustrate operation thereof in another mode where forming rolls are moved upwardly on opposite lateral sides of the centerline of the horizontal conveyor to provide the glass sheet forming to the different shapes illustrated.
Figure 11B:
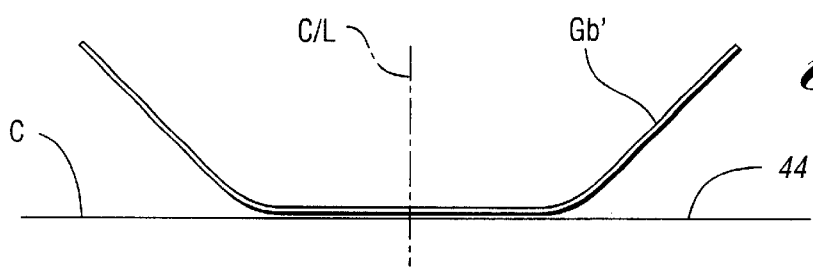
Figure 11C:
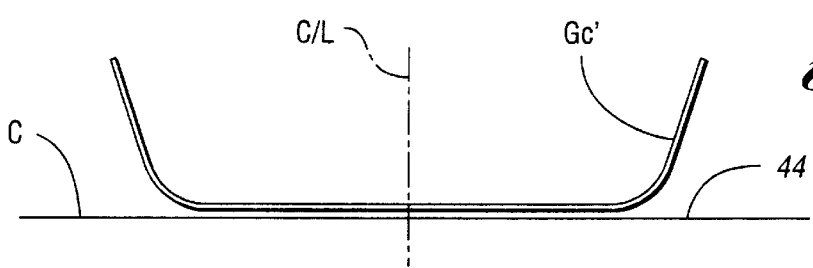
Figure 11D:
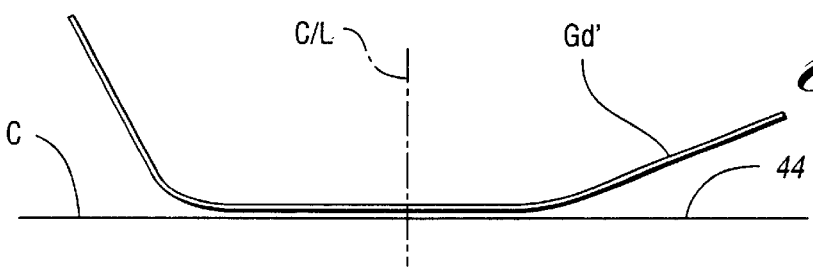
Figure 11E:
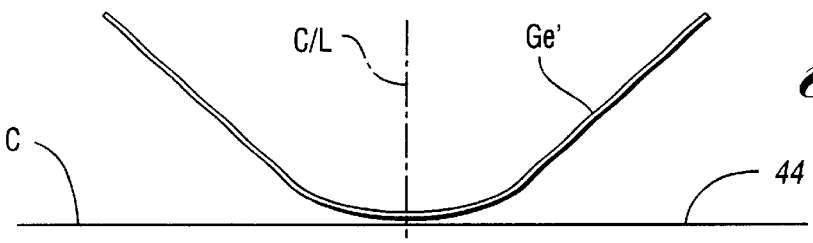
Figure 11F:
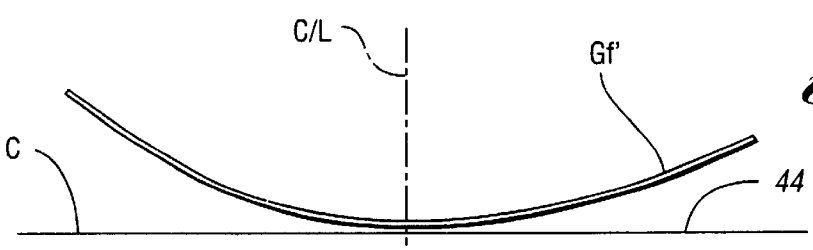

Forming station 26 as shown in FIGS. 2 and 3 includes a horizontal conveyor 44 having horizontal rolls 46 spaced from each other on the framework 34. More specifically, as illustrated in FIG. 3, the horizontal conveyor 44 has opposite lateral sides 48 including post supports 50 extending upwardly from the lower beams 36 of the framework 34. Between its opposite lateral sides 48, the horizontal conveyor 44 has post supports 50 extending upwardly from the lower beams 36 of framework 34 as shown in FIG. 3 to support opposite ends of the horizontal rolls 46. These horizontal rolls 46 are preferably made from steel and have tubular coverings of a temperature resistant cloth, such as a synthetic organic polymer that can be an aromatic polyamide as sold by DuPont Chemical Company of Wilmington, Del., United States of America, under the Trademark KEVLAR. As shown in FIG. 4, the right end of each horizontal roll is supported by a rotatable bearing 52 on the associated post support 50 under a spring bias that is releasable by a manual knob 54. As shown in FIG. 5, the left end of each horizontal roll is supported by a bearing 52 that is rotatably supported by the adjacent post support 50 and rotatably driven by a drive mechanism 56. An electric drive motor 58 of the drive mechanism 56 is mounted on the lower portion of the adjacent post support 50 and through a drive chain 60 rotatively drives a beveled gear and shaft drive 61 that extends upwardly through the post support and rotatively drives the bearing 52 and the supported horizontal roll 46. The rolls 46 of the horizontal conveyor 44 convey the glass sheet G as shown in FIG. 2 along a direction of conveyance A at a plane of conveyance C. As shown in FIG. 3, the horizontal conveyor 44 has a centerline C/L located centrally between its opposite lateral sides 48, i.e., there is the same lateral distance between the centerline C/L and each of the lateral sides 48 of the horizontal conveyor.

As illustrated in FIG. 2, the forming station 26 also includes a forming conveyor 62 including forming roll assemblies 64 spaced along the direction of conveyance between the horizontal rolls 46 of the horizontal conveyor 44 in an alternating relationship. The forming roll assemblies 64 as illustrated in FIG. 3 include a first set of forming rolls 66 and a second set of forming rolls 68 as is hereinafter more fully described. As shown in FIG. 4, each of the first set of forming rolls 66 has opposite ends 70 and 72 located on opposite sides of the centerline C/L of the horizontal conveyor 44 and also includes an intermediate portion 74 extending between its ends across the centerline C/L of the horizontal conveyor. Roll cradles 76 support the opposite ends 70 and 72 of each forming roll 66 on the opposite sides of the centerline C/L of the horizontal conveyor 44. An actuator collectively indicated by 78 pivotally moves the roll cradles 76 and the forming rolls 66 supported thereby between a lower position as shown by solid line representation in FIG. 3 and an upper position shown by phantom line representation. In the lower position, the forming roll 66 are located below the plane of conveyance C of the horizontal conveyor 44. In the upper position, the forming rolls 66 rollingly engage the heated glass sheet above the plane of conveyance C of the horizontal conveyor 44 at the centerline C/L to roll form the glass sheet.

As illustrated in FIG. 1, the forming station 26 also includes a forming press 80 located above the horizontal conveyor and including rotatable forming members 82 that rollingly engage the heated glass sheet G from above upon roll forming thereof by the forming conveyor to thereby cooperate with the forming rolls of the forming conveyor as previously described. The rotatable forming members 82 can be wheels or rolls as necessary to provide the required roll formed shape.

The forming roll assemblies 64 illustrated in FIG. 2 as previously mentioned also include a second set of forming rolls 68. Each of the second set of forming rolls 68 as illustrated in FIGS. 3 and 5 has opposite ends 84 and 86 located on the same side of the centerline C/L of the horizontal conveyor 44 and also has an intermediate portion 88 (FIG. 3) extending between its ends. A second set of roll cradles 90 supports the opposite ends 84 and 86 of each of the second set of forming rolls 68 on the framework 34 on the same side of the centerline C/L of the horizontal conveyor 44. A second actuator 92 of the forming conveyor 62 moves the second set of roll cradles 90 and the second set of forming rolls 68 supported thereby between lower and upper positions respectively shown by solid and phantom line representation in FIG. 3. In the lower solid line indicated position, the second set of forming rolls 68 are located below the plane of conveyance C of the horizontal conveyor 44. In the phantom line indicated upper position, the second set of forming rolls 68 are located above the plane of conveyance on only one side of the centerline C/L of the horizontal conveyor 44 and rollingly engage the heated glass sheet to cooperate with the first set of rolls 66 and the forming press 68 in roll forming the heated glass sheet.

Before proceeding with the description of the forming station and the rest of the processing system, reference to FIGS. 6 through 8 and to FIG. 9 illustrates two different types of forming rolls that can be utilized to provide the roll forming of the glass sheet. More specifically, the forming roll 66 illustrated in FIGS. 6 through 8 can be utilized to provide roll forming of a curved cylindrical shape as illustrated in FIGS. 3 and 4 in connection with the first set of forming rolls, while the forming roll 68 illustrated in FIG. 9 can be utilized to provide roll forming of a flat shape as previously described in connection with the second set of forming rolls illustrated in FIGS. 3 and 4.

As illustrated in FIGS. 6 through 8, the forming roll 66 includes a backbone 94 having a tensioning member 96 extending between a cradle attachment 98 at the one roll and 70 and a cradle nut connection 100 at the other end 72. Backbone 94 also includes support members 102 through which the tensioning member 96 extends between the opposite roll ends. As shown in FIG. 8, the support members 102 have a male end 104 and a female end 106 that receives the male end 104 of the adjacent support member such that the tensioning member 96 allows adjustment of the relative position as well as securement thereof in a fixed position upon appropriate threading of the nut connection 100. A roll tube 106 at the roll end 72 supports a drive gear 108 as shown in FIG. 6 and is secured to a helical spring 110 through which the backbone 94 extends. A high temperature cloth sleeve 112 of an organic resin such as KEVLAR extends over the spring 110 between the tube 106 and the roll end 70. A drive chain 114 that rotatively drives the gear 108 and thus rotates the tube 106 and its connected spring 110 as well as the cloth sleeve 112 over the backbone 94 to provide rotational driving.

In order to provide the roll forming, the forming roll 66 illustrated in FIGS. 6 through 8 is positioned against a template of the required shape with the nut connection 100 loosened so that rotation can take place between the support members 102 to the proper position with respect to each other. After such template positioning of the roll 66 to the required shape, the nut connection 100 is tightened to tension the tensioning member 96 and thereby fix the location of the support members 102 with respect to each other so that the backbone stays in the same shape during the roll forming. During such roll forming, the helical spring 110 and its cloth sleeve 112 rotate over the backbone 94 under the driving operation of the roll tube 106 and the drive gear 108 as driven by the drive chain 114. This forming roll 66 is thus capable of providing roll forming of curved cylindrical shapes.

With reference to FIG. 9, the forming roll 68 illustrated includes a straight roll tube 116 of steel that extends to the roll end 84 for rotational support by a bearing 118 on a cradle attachment 120 for attaching to cradle 90. At the other roll end 86, the roll tube 116 is rotatably supported by the cradle 90 and has a drive gear 122 that is rotatively driven by a drive chain 124. Roll tube 116 is made of steel and is covered by a high temperature cloth sleeve 126 such as of KEVLAR. This forming roll 68 thus provides roll forming of flat shapes as previously described in connection with the second set of forming rolls 68 illustrated in FIGS. 3 and 5.

With reference to FIGS. 3 and 4, the forming conveyor 62 includes pivotal supports 128 that pivotally mount the first set of roll cradles 76 on one side of the centerline C/L of the horizontal conveyor 44 at a location below the plane of conveyance C of the horizontal conveyor. The associated first actuator 78 has connections 130 to the first set of roll cradles 76 on the other side of the centerline C/L of the horizontal conveyor 44 to provide vertical movement that moves the roll cradles 76 and the first set of forming rolls 66 between the lower and upper positions as previously described to provide the roll forming. The first actuator 78 as illustrated in FIG. 2 includes a connection member 132 that extends between the connections 130 to the first set of roll cradles 76 and is connected to a pair of curved end connectors 134 by pivotal connections 136 illustrated in FIG. 4. Actuating chains 138 are secured to the curved end connectors 134 and extend upwardly therefrom as shown in FIGS. 2 and 3 to an associated electric motor drive 140 to provide the driving of the actuator 78 for moving the first set of rolls 66 between the lower and upper positions as previously described.

With reference to FIGS. 3 and 4, the forming conveyor 62 includes pivotal supports 142 that pivotally mount the second set of roll cradles 90 on the same side of the horizontal conveyor centerline C/L as the pivotal supports 128 that pivotally support the first set of roll cradles 76. These pivotal supports 142 like the pivotal supports 128 provide support of the associated set of roll cradles at a location below the plane of conveyance C of the horizontal conveyor 44. The second actuator 92 includes connections 144 to the second set of roll cradles 90 on the same side of the horizontal conveyor centerline C/L as the pivotal supports 142. A connection member 146 extends between the connections 144 to the second set of roll cradles 90 and is connected to a pair of curved end connectors 148 (only one shown) by pivotal connections 150 in the same manner previously described in connection with the first actuator. Actuating chains 150 extend upwardly from the curved end connectors 148 as illustrated in FIG. 3 to an associated drive motor 152.

As previously mentioned in connection with FIG. 1, the glass sheet processing system 20 also includes a quench station 24 for rapidly quenching the formed glass sheet to provide heat strengthening or tempering thereof after the roll forming in the manner previously described.

The construction of the forming station 26 as previously described provides the capability of providing bent shapes that have not previously been possible by roll forming. Such shapes are illustrated by FIGS. 10a through 10g. More specifically, different shapes of rolled glass sheets Ga through Gg are illustrated with straight and curved shapes wherein roll forming takes place for a greater lateral distance of one shape than one-half of the lateral width of the horizontal conveyor 44 which is permitted by virtue of the forming conveyor construction previously described.

Forming station 26 as illustrated in FIG. 3 also includes first and second carriages 154 and 156 that respectively support the first and second sets of roll cradles 76 and 90 for movement on the framework 38 laterally with respect to the direction of conveyance between the position shown by solid line representation and the position partially shown by phantom line representation. Each of these carriages 154 and 156 includes lower beams 158 and 160 that are supported by associated slideways 162 and 164 on the floor beams 36. Vertical half posts 166 and 168 respectively extend upwardly from the lower beams 158 and 160 to mount the pivotal supports 128 and 142 on which the first and second sets of roll cradles 76 and 90 are pivotally mounted as previously described. Posts 170 and 172 respectively extend upwardly from the first and second carriage lower beams 158 and 160 and respectively support the drive motors 140 and 152 of the first and second actuators 78 and 92 as previously described. Upon movement of the first carriage 154 from the solid line indicated position illustrated to the phantom line indicated position, the first set of forming rolls 66 is moved from the position illustrated where its opposite ends 70 and 72 are on opposite sides of the centerline C/L of the horizontal conveyor 44 to a position where its opposite ends are on the same side of the horizontal conveyor centerline C/L. Likewise, movement of the second carriage 156 from the solid line indicated position illustrated to the phantom line indicated position move the second set of forming rolls 68 laterally with respect to the direction of conveyance so that its roll ends 84 are positioned adjacent the horizontal conveyor centerline C/L rather than in a laterally spaced relationship. Such positioning of the first and second carriages 154 and 156 permits roll forming with the different roll shapes on opposite sides of the centerline formed by associated forming rolls so as to provide the glass shapes respectively illustrated by FIGS. 11a through 11f. More specifically, each of the glass sheets Ga' through Gf' has forming with different straight and curved shapes formed by forming rolls that are moved on opposite sides of the centerline C/L rather than across the centerline.

The construction of the forming station 26 thus provides great versatility in the type of roll forming of glass sheets that can be performed in a manner that has not heretofore been possible with glass sheet roll forming.

While the best mode for carrying out the invention has been described in detail, those familiar with the art to which this invention relates will recognize various alternative ways for practicing the invention as defined by the following claims.

What is claimed is:

1. A method for roll forming a heated glass sheet, comprising:

conveying the heated glass sheet onto a horizontal conveyor at a plane of conveyance thereof on horizontal rolls thereof spaced along a direction of conveyance and extending between opposite lateral sides of the horizontal conveyor with a centerline located centrally therebetween;

pivotally moving a set of forming rolls upwardly on roll cradles that are pivotally supported on one side of the centerline of the horizontal conveyor and that are actuated for vertical movement at the other side of the centerline of the horizontal conveyor to move the set of forming rolls upwardly between the horizontal rolls on opposite sides of and at the centerline of the horizontal conveyor such that the forming rolls rollingly engage and roll form the heated glass sheet above the plane of conveyance of the horizontal conveyor at its centerline; and rollingly engaging the heated glass sheet from above to cooperate with the forming rolls in roll forming the heated glass sheet.

2. A method for roll forming a heated glass sheet as in claim 1 wherein a second set of forming rolls is moved upwardly between the horizontal rolls of the horizontal conveyor to cooperate with the first mentioned set of forming rolls and with rolling members that provide the rolling engagement of the heated glass sheet from above.

3. A method for roll forming a heated glass sheet as in claim 2 wherein the second set of forming rolls are moved on a second set of rolls cradles that are pivotally supported and actuated for vertical movement on the same side of the centerline of the horizontal conveyor.

4. A method for roll forming a heated glass sheet as in any one of claims 1, 2 or 3 and further comprising quenching the formed glass sheet.

5. A method for roll forming a heated glass sheet, comprising:

conveying the heated glass sheet onto a horizontal conveyor on horizontal rolls thereof spaced along a direction of conveyance and extending between opposite lateral sides of the horizontal conveyor with a centerline therebetween;

pivotally moving first and second sets of forming rolls upwardly between the horizontal rolls to rollingly engage and roll form the heated glass sheet above a plane of conveyance of the horizontal conveyor with the first set of forming rolls located above the plane of conveyance of the horizontal conveyor at its centerline and on opposite sides thereof, and with the second set of forming rolls above the plane of conveyance of the horizontal conveyor on only one side of its centerline;

rollingly engaging the heated glass sheet from above to cooperate with the forming rolls in roll forming the heated glass sheet; and quenching the formed glass sheet.

* * * * *